(12) United States Patent
Pedersen et al.

(10) Patent No.: US 7,803,329 B2
(45) Date of Patent: Sep. 28, 2010

(54) APPARATUS AND METHODS FOR THE PRODUCTION OF AMMONIA AND FISCHER-TROPSCH LIQUIDS

(75) Inventors: Peter S. Pedersen, Boulder, CO (US); Dennis L. Yakobson, Arvada, CO (US)

(73) Assignee: Rentech, Inc., Los Angeles, CA (US)

( * ) Notice: Subject to any disclaimer, the term of this patent is extended or adjusted under 35 U.S.C. 154(b) by 460 days.

(21) Appl. No.: 11/874,741

(22) Filed: Oct. 18, 2007

(65) Prior Publication Data

US 2008/0132588 A1   Jun. 5, 2008

Related U.S. Application Data

(63) Continuation of application No. 11/004,036, filed on Dec. 3, 2004, now Pat. No. 7,300,642.

(60) Provisional application No. 60/526,515, filed on Dec. 3, 2003.

(51) Int. Cl.
*B01J 8/00* (2006.01)
*C07C 27/00* (2006.01)
*C01C 1/02* (2006.01)

(52) U.S. Cl. .............. 422/188; 422/187; 422/189; 422/190; 422/148; 423/359; 518/702; 518/705

(58) Field of Classification Search .............. None
See application file for complete search history.

(56) References Cited

U.S. PATENT DOCUMENTS

| | | | | |
|---|---|---|---|---|
| 6,248,794 | B1 * | 6/2001 | Gieskes | 518/700 |
| 6,586,480 | B1 * | 7/2003 | Zhou et al. | 518/700 |
| 6,632,846 | B2 * | 10/2003 | Sheppard et al. | 518/715 |
| 6,900,247 | B2 * | 5/2005 | Price et al. | 518/702 |
| 6,976,362 | B2 * | 12/2005 | Sheppard et al. | 60/780 |

* cited by examiner

Primary Examiner—Jennifer A Leung
(74) Attorney, Agent, or Firm—Conley Rose, P.C.

(57) ABSTRACT

A gasification plant and methods for producing ammonia, Fischer-Tropsch fuels, electrical power, and/or sulfur from carbon-bearing feedstocks including coal and/or petroleum coke. Methods for production of desired relative amounts of ammonia and Fischer-Tropsch liquid hydrocarbons by adjusting the amount of synthesis gas bypassing the Fischer-Tropsch reactor. The multi-product and integrated plants may be used to reduce the amount of $CO_2$ vented into the atmosphere during the production of these products.

10 Claims, 2 Drawing Sheets

APPARATUS AND METHODS FOR THE PRODUCTION OF AMMONIA AND FISCHER-TROPSCH LIQUIDS

CROSS-REFERENCE TO RELATED APPLICATIONS

This non-provisional utility application is a continuation of U.S. patent application Ser. No. 11/004,036, filed Dec. 3, 2004, which claims priority to U.S. Provisional Application No. 60/526,515 filed Dec. 3, 2003.

INCORPORATION BY REFERENCE

STATEMENT REGARDING FEDERALLY SPONSORED RESEARCH OR DEVELOPMENT

Not Applicable.

FIELD OF THE INVENTION

The present invention relates generally to the field of syngas generators, such as reformers and gasifiers of hydrocarbon fluids and solid carbonaceous materials, and Fischer-Tropsch (FT) units primarily for creating liquid hydrocarbons from syngas. Syngas generators, FT, and ammonia synthesis are combined to create an integrated plant for providing one or more of ammonia, carbon dioxide, electric power, and even sulfur when dealing with sulfur-containing raw material.

BACKGROUND OF THE INVENTION

Our modern civilization cannot be sustained without burning carbonaceous materials for primarily motive and electrical power within the foreseeable future. The carbon dioxide ($CO_2$) generated by such burning may be contributing to the gradual increase of the planet's temperature since 1900. This is occurring because $CO_2$ permits the sun's energy to pass through the atmosphere, but traps the longer wavelength energy radiated by the earth into the atmosphere.

The integrated plants and processes of this invention can help reduce the amount of $CO_2$ currently vented into the air as a by-product of synthesizing the various products later discussed in the description of the manufacturing plant flow diagrams. Consequently, the reduction of $CO_2$, which is a greenhouse gas, through the sequestration processes detailed herein, reduces the amount of greenhouse gases vented into the atmosphere. Further, the plants of this invention produce substantial energy savings by balancing exothermic and endothermic reactors as discussed below.

U.S. Pat. No. 6,306,917 to Mark S. Bohn et al. teaches that hydrocarbons, carbon dioxide, and electric power can be manufactured at a plant using the Fischer-Tropsch (FT) reactors. It also suggests that urea can be produced from the carbon dioxide but no suggestion is given as to what facilities or processes are needed to manufacture the urea or the economic practicality of such a course. U.S. Pat. No. 6,632,846 to Sheppard et al. teaches that ammonia, carbon dioxide, hydrocarbons, electric power and urea can be manufactured using FT reactors. Urea is produced from reacting the ammonia with the carbon dioxide.

In U.S. Pat. No. 4,886,651, Patel et al. describe an integrated system that produces methanol, ammonia, and higher alcohols from natural gas. Steam reformers are used to produce streams of gases rich in hydrogen. Nitrogen for the ammonia synthesis is obtained from an air separation unit. The process is not relevant to a coal or petroleum coke feedstock.

In U.S. Pat. No. 6,248,794, Gieskes describes an integrated process for converting hydrocarbon gas to liquids. The tail gases from the Fischer-Tropsch reactor are used only as fuel. Also, the systems described are not relevant to systems using a solid carbonaceous feedstock.

In U.S. Patent Application Publication No. 2002/0143219, Price et al. describe a system for converting natural gas to hydrocarbons and ammonia. Tail gases from a FT reactor are recycled to the front end to a reformer in one example, and tail gases are recycled back to a second autothermal reformer in another example. Here again, solid carbonaceous feedstocks requiring gasification cannot be used in this system.

In U.S. Pat. No. 6,586,480, Zhou et al. describe an integrated system using synthesis gas derived from coal for producing hydrocarbon liquids and ammonia. In this system, the FT tail gas is shifted and hydrogen removed from the shifted tail gases is used in ammonia production. Reforming the gaseous hydrocarbons in the FT tail gases is not considered.

The mentioned references deal with economic niches where tax incentives, regulatory penalties and other incentives must combine with other factors to make the processes commercial. A continuing increase in world temperatures or a firmer tie-in between the $CO_2$ in the atmosphere and increasing world climate temperatures could quickly result in such incentives. The plants can be of particular utility when sited at remote locations where there is a large surplus of natural gas, petroleum, coal or other carbonaceous materials which are presently unrecoverable because of transportation costs, etc.

Increasing regulatory demands have limited, and, in some instances extinguished, the petroleum producers' and refiners' ability to flare waste gases. Further, there are often limitations on the amounts and kinds of other wastes that can be disposed of locally without harm to the environment, e.g., at an offshore crude oil producing platform. The multi-product plants of this invention provide a mechanism for packaging the various unit processes required for the utilization of this invention in a manner that the resulting plants can be utilized to supply electricity for a platform, eliminate the need for flares, convert the waste gases and liquids normally flared into liquid hydrocarbons and ammonia substantially eliminating local $CO_2$ emissions. Solid commercial products can also be produced for agriculture, e.g., sulfur.

The unit processes of this invention are each individually well known and the economics of the processes have been commercially proven. However, the joining of these unit processes as taught herein provides a utility for environmental and other purposes that has heretofore been unforeseen.

BRIEF SUMMARY OF THE INVENTION

With the present invention, cleaned syngas generated by gasification of a carbonaceous raw material with oxygen and produced in an Air Separation Unit (ASU) is introduced into a Fischer-Tropsch (FT) synthesis unit for production of liquid hydrocarbons. The tail gases from the Fischer-Tropsch reactor containing significant amounts of gaseous hydrocarbons are reformed in a steam reformer to produce additional amounts of hydrogen. The CO in the tail gas from the FT unit and in the bypassed synthesis gas is shifted to produce hydrogen ($H_2$) which, after extraction, e.g., in a hydrogen membrane, and purification, is combined with nitrogen ($N_2$) from the ASU in the correct ratio for ammonia production, typically around a molar ratio of $H_2:N_2=3$. This mixture is compressed and introduced into a standard ammonia synthesis loop. After extraction of the $H_2$, the residual gas can be used for power generation, e.g., in a combined cycle power unit.

The FT production relative to the ammonia production may be adjusted by bypassing more or less syngas around the FT synthesis unit.

As a variation to the above, the FT tail gas may be combined with the by-passed synthesis gas and shifted. Hydrogen removed from the shifted gas is used in the ammonia synthesis reactor while the remaining tail gases may be used as fuel in a gas turbine combustor.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION OF THE FIGURES

Figure 1:
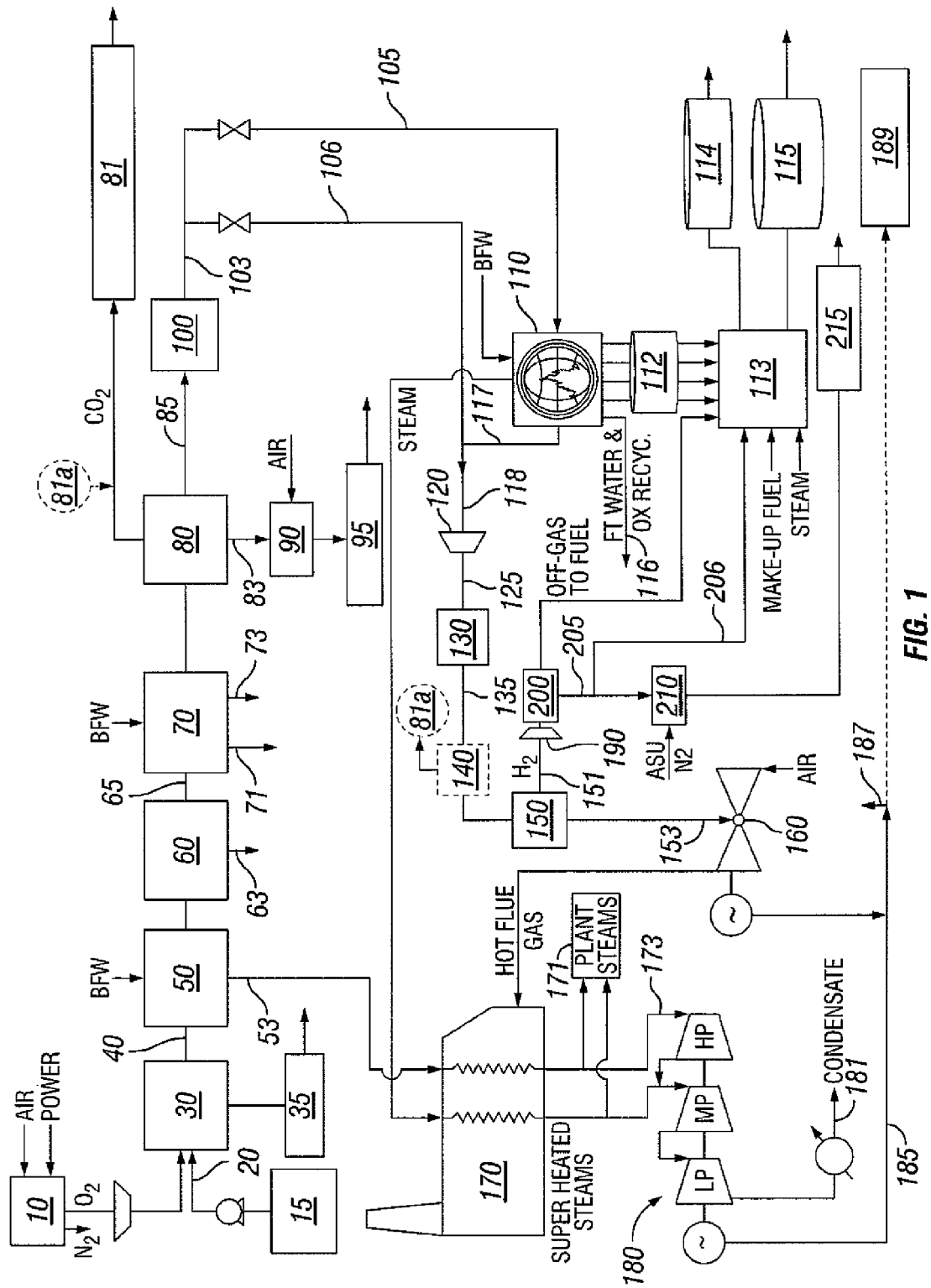
FIG. 1 is a simplified flow diagram of the disclosed process of producing ammonia and FT liquids.

FIG. 1 discloses a process for producing ammonia, FT fuels and power. Oxygen and nitrogen are separated from air in air separation unit 10. Carbonaceous raw material and water from tank 15 and oxygen from unit 10 are introduced into synthesis gas generator 30 as slurry 20. As shown in Examples 1 and 2, a slurry of coal and/or petroleum coke is used. Under synthesis gas forming operating conditions, synthesis gas 40 comprising hydrogen, carbon monoxide, carbon dioxide, methane, water, and sulfur compounds is produced. Although synthesis gas generator 30 is a gasifier in this example, other types of gas generators may be used. Inorganic slag 35 is exported for sale or other uses including disposal.

Synthesis gas 40 is fed to process boiler 50 for steam heat recovery before it is introduced into syngas cleaning unit 60 for char removal. Boiler 50 produces high pressure steam 53 while reducing the temperature of the syngas. Char 63 is recycled to gasifier 30.

Reactor effluent gas, or cleaned syngas 65, is cooled in unit 70 and then processed through acid gas removal (AGR) unit 80 to remove hydrogen sulfide and carbon dioxide. An amine scrubbing system or other AGR system known to one skilled in the art may be used. For cooling, a tubular heat exchanger or other known systems may be utilized. Process condensate water 71 and hot boiler feed water 73 are recycled respectively for plant uses.

Essentially all of the sulfur in feedstock 20 is converted to $H_2S$ during syngas generation. Having undergone acid gas removal in unit 80, $H_2S$ produced in generator 30 is contained in acid gas stream 83 and may be recovered by utilizing a sulfur recovery system 90. For example, for large amounts of sulfur and relatively high $H_2S$, a Claus unit may be employed. Since the amount of $H_2S$ produced depends on the sulfur content of a feedstock, the type of sulfur recovery system required would depend on the desired sulfur recovery efficiency, the quantity of sulfur to be removed, and the concentration of the $H_2S$ in the acid gas, other types of sulfur recovery systems should be evaluated to maximize the installation of best available control technology. Once recovered, sulfur 95 may be exported. Carbon dioxide 81 from acid gas removal unit 80 may be sequestered for sale or for other on-site or off-site uses.

After acid gas removal, further cleaning to remove contaminants detrimental to the downstream FT catalyst is required. Synthesis gas 85 is passed through guard beds 100 to reduce contaminant levels in the synthesis gas before it is admitted to the FT reactor. A zinc oxide bed can be used to remove a few ppm of hydrogen sulfide. Other types of guard beds and various configuration of beds may be utilized.

A portion 105 of synthesis gas 103 is introduced into Fischer-Tropsch reactor 110 where primarily aliphatic hydrocarbons and carbon dioxide are formed. Liquid hydrocarbons 112 from this reaction are separated from Fischer-Tropsch tail gas 117 comprising carbon dioxide, uncondensed hydrocarbons, unreacted hydrogen and unreacted carbon monoxide. Separated FT effluent 116 may be recycled to the slurry preparation tank 15. Liquid hydrocarbons 112 undergo product upgrade in reactor 113 where hydrotreating allows products such as naphtha 114 and diesel 115 to be exported.

A portion 106 of synthesis gas 103 is combined with Fischer-Tropsch tail gas 117 from FT reactor 110 whereby gas mixture 118 is formed. Gas mixture 118 is compressed to an elevated pressure using compressor 120. Compressed gas mixture 125 is then introduced along with steam into one or more shift reactors 130 to convert a portion of the carbon monoxide in the FT tail gas and water to hydrogen and carbon dioxide. Shifted gases 135 are introduced into hydrogen membrane separator 150 to produce two gas streams-stream 151 comprising hydrogen-rich gases and stream 153 comprising hydrogen-lean gases. Optionally, absorption unit 140 may be used to remove carbon dioxide from shifted gases 135 before introducing the gases into hydrogen membrane separator 150. Carbon dioxide from the absorption unit may be combined for sequestration with the carbon dioxide 81 from acid gas removal as denoted by 81a.

Stream 153 is burned in gas turbine combustor 160 exhausting into heat recovery steam generator (HRSG) 170. Through HRSG 170, high pressure steam 173 is directed through steam turbine/generator set 180, e.g., a three-stage turbine mechanically coupled to a generator, during the production of electricity. Low pressure steam 181 from the turbine may be directed to export. Power 185 can be allocated as parasitic power 187 to feed the plant or exportable power 189. Steam 171 from HRSG 170 is a source of plant steam.

Stream 151 is compressed to an elevated pressure in compressor 190 and then introduced into pressure swing adsorption unit 200 to produce a stream 205 of high purity hydrogen. Stream 205 together with nitrogen from air separation unit 10 is introduced into reactor 210 to produce ammonia 215 for sale. A portion 206 of stream 205 is used for product upgrade of liquid hydrocarbons 112 from FT reactor 110.

Figure 2:
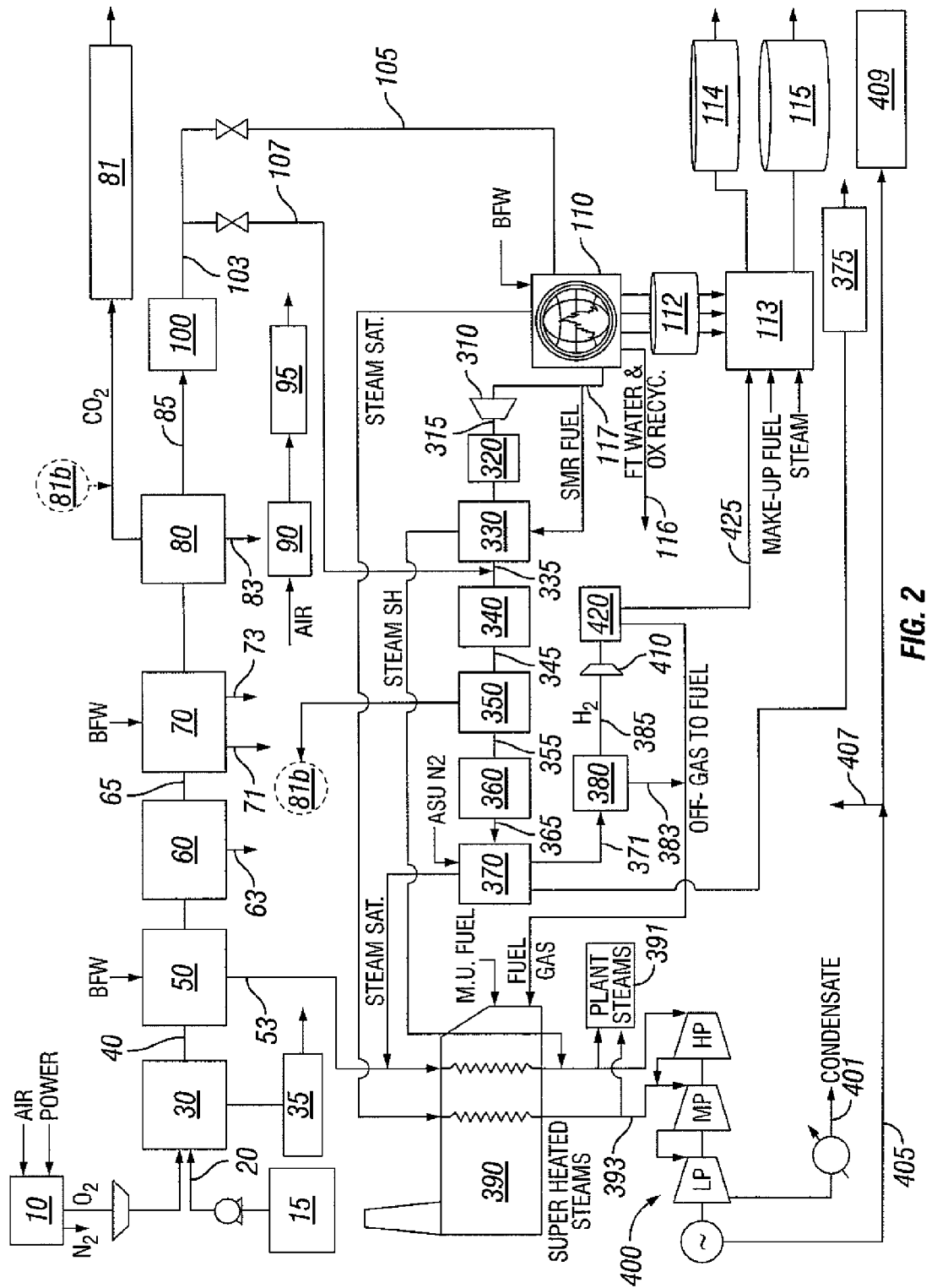
FIG. 2 is a simplified flow diagram of an alternative process for producing ammonia and FT liquids.

FIG. 2 discloses an alternative process for producing ammonia, FT fuels and power. The processes before the introduction of synthesis gas into the FT reactor are similar to those of FIG. 1. A portion 105 of synthesis gas 103 is introduced into Fischer-Tropsch reactor 110 where primarily aliphatic hydrocarbons and carbon dioxide are formed. Liquid hydrocarbons 112 from this reaction are separated from Fischer-Tropsch tail gas 117. Liquid hydrocarbons 112 undergo product upgrade in hydrotreater 113 wherein products such as naphtha 114 and diesel 115 may be produced, e.g., for export.

In this alternative process, Fischer-Tropsch tail gas 117 from FT reactor 110 is compressed to an elevated pressure using compressor 310. Compressed FT tail gas 315 is then introduced into steam methane reformer 330. Steam methane reformers typically use natural gas comprising methane, ethane and smaller amounts of other gaseous hydrocarbons as a feedstock. In this embodiment, the methane, ethane, ethylene, propane, propylene, butane, butane and/or small amounts of higher hydrocarbons in the FT tail gas serve as feedstock. Hydrocarbons in FT tail gas 315 and water are converted to reformer effluent 335 comprising hydrogen, carbon monoxide, and carbon dioxide. Here, the portion of synthesis gas, which was previously combined with the Fischer-Tropsch tail gas from the FT reactor, is introduced into the ammonia plant train before shifting occurs. Thus, portion 107 of synthesis gas 103 is combined with reformer effluent 335 whereby the gas mixture is fed to shift reactor 340. In the shift reactor, carbon monoxide is reacted with more steam to produce a mixture of carbon dioxide and hydrogen. Shifter effluent 345 is fed into carbon dioxide absorption unit 350 wherefrom $CO_2$ is removed. Carbon dioxide from the absorption unit 350 may be combined for sequestration with the carbon dioxide 81 as denoted by 81b. The product 355 of the absorption unit contains traces of CO and $CO_2$ in a highly concentrated hydrogen stream. The carbon dioxide removal unit 350 may use an amine for absorption. Methanator 360 is used to convert the trace CO and $CO_2$ in stream 335 to methane. The methanator effluent 365 comprises high purity hydrogen and methane. Effluent 365 together with nitrogen from air separation unit 10 are introduced into reactor 370 to produce ammonia 375 for sale. Adiabatic pre-reformer 320 may be used to remove unsaturated hydrocarbons, which may form carbon in the reformer, from compressed tail gas 315 prior to introduction into steam reformer 330. The ammonia loop comprising units 330, 340, 350, 360, and 370 may be in an existing ammonia plant.

Purge stream 371 is introduced into hydrogen membrane separator 380 to produce two gas streams-stream 385 comprising hydrogen-rich gases and stream 383 comprising hydrogen-lean gases. Stream 383 is burned in HRSG 390. Through HRSG 390, high pressure steam 393 is directed through steam turbine/generator set 400, e.g., a three-stage turbine mechanically coupled to a generator, during the production of electricity. Low pressure steam 401 from the turbine may be directed to export. Power 405 can be allocated as parasitic power 407 to feed the plant or exportable power 409. Steam 391 from HRSG 390 is a source of plant steam.

Stream 385 is compressed to an elevated pressure in compressor 410 and then introduced into pressure swing adsorption unit 420 to produce a stream 425 of high purity hydrogen which is used for product upgrade of liquid hydrocarbons 112 from FT reactor 110.

Similar to FIG. 1, $H_2S$ produced in generator 30 is contained in acid gas stream 83 and may be recovered by utilizing a sulfur recovery system 90. Once it is recovered, sulfur 95 may be exported.

The following calculated examples are presented to further illustrate the process. Example 1 is based on FIG. 1. Example 2 is based on FIG. 2.

EXAMPLE 1

Two thousand (2,000) short tons per day (STPD) of petroleum coke containing 7% moisture are gasified to produce synthesis gas comprised of hydrogen, carbon monoxide, carbon dioxide, water, methane, nitrogen and impurities. After condensing the water and removal of impurities, the remaining gases are divided into two streams. One stream is fed to a slurry Fischer-Tropsch reactor utilizing an iron-based catalyst. The tail gases from the FT reactor after liquid product removal are comprised of hydrogen, carbon monoxide, carbon dioxide, nitrogen, ethane, ethylene, propane, propylene, butane, butene, pentane, pentene, and smaller amounts of higher hydrocarbons. These tail gases are combined with the other stream bypassing the FT reactor and the combined gases are fed to a shift reactor to produce hydrogen and carbon dioxide from carbon monoxide and water. The gases from the shift reactor are fed to a hydrogen membrane separator for recovering hydrogen. The hydrogen permeate from the membrane separator is compressed and refined to high purity using a pressure swing adsorption (PSA) unit. The purified hydrogen from the PSA unit is fed to an ammonia synthesis reactor where it reacts with nitrogen from the air separation unit to produce ammonia for export. A small portion of the purified hydrogen is used for upgrading the FT products. Off-gases from the hydrogen membrane separator are used for fuel in a gas turbine combustor. Flue gases from the gas turbine combustor provide heat required by the heat recovery steam generator (HRSG). Steam from the gasifier process boiler, the FT reactor cooling, and the ammonia synthesis reactor cooling are fed to the HRSG. Electrical power from both the steam turbine and gas turbine is used for plant requirements.

Based on the process described above using 2,000 STPD of petroleum coke as the feedstock, calculations using in-house software programs show that the following amounts of FT products and ammonia can be produced for export:

|  | Synthesis Gas Bypassing FT Reactor | | |
|---|---|---|---|
| Products | 0% | 50% | 100% |
| FT Product, BPD | 3400 | 1700 | 0 |
| Ammonia, STPD | 467 | 1023 | 1596 |

EXAMPLE 2

Five thousand one hundred and seventy (5,170) short tons per day (STPD) of Wyoming Powder River Basin (PRB) coal containing 30% moisture are gasified to produce synthesis gas comprised of hydrogen, carbon monoxide, carbon dioxide, water, methane, nitrogen and impurities. After condensing the water and removal of impurities, the remaining gases are divided into two streams. One stream is fed to a slurry Fischer-Tropsch reactor utilizing an iron-based catalyst. The tail gases from the FT reactor after liquid product removal are comprised of hydrogen, carbon monoxide, carbon dioxide, nitrogen, ethane, ethylene, propane, propylene, butane, butene, pentane, pentene, and smaller amounts of higher hydrocarbons. Approximately 25% of these tail gases are separated for use as fuel for the steam reformer described below. Approximately 75% of these gases are compressed and fed to an adiabatic pre-reformer for removal of olefins. The gases exiting the pre-reformer are combined with steam and fed to a steam reformer for producing hydrogen, carbon monoxide, carbon dioxide, methane and water. The other stream bypassing the FT reactor is combined with the effluent from the steam reformer and the combined gases are fed to a shift reactor to produce hydrogen and carbon dioxide from carbon monoxide and water. The carbon dioxide is removed from the shifted gases and combined with the carbon dioxide from the acid gas removal system. This concentrated stream of carbon dioxide can be sequestered. The remaining gases are fed to a methanator for removal of carbon monoxide. The remaining gases comprised of hydrogen, nitrogen and methane are combined with nitrogen from the air separation unit and fed to an ammonia synthesis reactor. Ammonia from the ammonia synthesis reactor is exported for sale. A small purge stream from the ammonia synthesis reactor is fed to a hydrogen membrane separator for recovery of hydrogen. The hydrogen permeate from the membrane separator is compressed and refined to high purity using a pressure swing adsorption (PSA) unit. The purified hydrogen from the PSA unit is used for upgrading the FT products. Off-gases from the hydrogen membrane separator and the PSA unit are used for fuel in the heat recovery steam generator (HRSG). Steam from the gasifier process boiler, the FT reactor cooling, reformer flue gases, and the ammonia synthesis reactor cooling are fed to the HRSG. The superheated steam from the HRSG is used in a steam turbine for generating electrical power for plant usage and for export.

Based on the process described above using 5,170 STPD of Powder River Basin Coal as the feedstock, calculations using in-house software programs show that the following amounts of FT products and ammonia can be produced for export:

|  | Synthesis Gas Bypassing FT Reactor | | |
| --- | --- | --- | --- |
| Products | 0% | 50% | 100% |
| FT Product, BPD | 5000 | 2500 | 0 |
| Ammonia, STPD | 666 | 1652 | 2636 |

Although the present invention has been described with reference to various embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A multi-product plant for the production of ammonia and Fischer-Tropsch hydrocarbons, the plant comprising:
   an air separation unit comprising an inlet for air and outlets for oxygen and nitrogen;
   a synthesis gas generator comprising inlets whereby oxygen from the air separation unit, carbonaceous raw material, and water are introduced to the synthesis gas generator, and an outlet for synthesis gas, the synthesis gas generator being adapted to convert the oxygen, carbonaceous raw material, and water under synthesis gas forming operating conditions into synthesis gas;
   a cooling unit for cooling the synthesis gas, the cooling unit comprising outlets for water and cooled synthesis gas;
   a means for separating the cooled synthesis gas into a first portion of synthesis gas and a second portion of synthesis gas;
   a Fischer-Tropsch reactor, the Fischer-Tropsch reactor comprising an inlet for the first portion of synthesis gas, an outlet for tail gases comprising unreacted carbon monoxide, carbon dioxide, and gaseous hydrocarbons and an outlet for liquid hydrocarbons; the Fischer-Tropsch reactor adapted to form primarily aliphatic hydrocarbons and carbon dioxide from the first portion of synthesis gas;
   a compressor comprising an inlet for the second portion of the synthesis gas and the Fischer-Tropsch tail gas and an outlet for a compressed gas mixture;
   one or more shift reactors comprising inlets for the compressed gas mixture and steam and an outlet for shifted gases comprising hydrogen and carbon dioxide; the one or more shift reactors adapted to convert a portion of the carbon monoxide and water to hydrogen and carbon dioxide;
   a hydrogen membrane separator comprising an inlet for the shifted gases and outlets for a hydrogen-rich gas stream and a hydrogen-lean gas stream;
   a gas turbine combustor of a combined cycle plant, the gas turbine combustor comprising an inlet for the hydrogen-lean gas stream, adapted for burning the hydrogen-lean gases to drive a generator mechanically coupled to the gas turbine thereby producing electricity;
   a compressor comprising an inlet for the hydrogen-rich gas stream and an outlet for elevated pressure hydrogen-rich gas;
   a pressure swing adsorption unit comprising an inlet for the elevated pressure hydrogen-rich gas and an outlet for high purity hydrogen; and
   a reactor comprising inlets for a portion of the high purity hydrogen and nitrogen from the air separation unit and adapted to produce ammonia from the high purity hydrogen and the nitrogen.

2. The multi-product plant of claim 1 further comprising at least one cleaning unit adapted to remove from the synthesis gas at least one selected from the group consisting of sulfur compounds, carbon dioxide, and char; the at least one cleaning unit comprising an inlet for synthesis gas and an outlet for cleaned synthesis gas, the at least one cleaning unit positioned upstream or downstream of the cooling unit for cooling the synthesis gas, and upstream of the Fischer-Tropsch reactor.

3. The multi-product plant of claim 2 wherein the at least one cleaning unit comprises an acid gas removal unit, the acid gas removal unit further comprising an outlet for a stream comprising hydrogen sulfide.

4. The multi-product plant of claim 3 wherein the acid gas removal unit further comprises an outlet for carbon dioxide.

5. The multi-product plant of claim 1 further comprising a product upgrade unit, the product upgrade unit comprising an inlet for at least a portion of the liquid hydrocarbons from the Fischer-Tropsch reactor and an inlet for a portion of the high purity hydrogen from the pressure swing absorption unit, the product upgrade unit adapted for upgrading the liquid hydrocarbons by hydrotreating.

6. An integrated system for the economical production of ammonia via steam methane reforming of a gas mixture comprising Fischer-Tropsch tail gases, and for the production of liquid hydrocarbons via Fischer-Tropsch reaction; the system comprising:
   an air separation unit comprising an inlet for air and outlets for oxygen and nitrogen;
   a synthesis gas generator comprising inlets whereby oxygen from the air separation unit, carbonaceous raw material, and water are introduced to the synthesis gas generator, and an outlet for synthesis gas, the synthesis gas generator being adapted to convert the oxygen, carbonaceous raw material, and water under synthesis gas forming operating conditions into synthesis gas;
   a cooling unit for cooling the synthesis gas, the cooling unit comprising outlets for water and cooled synthesis gas;
   a means for separating the cooled synthesis gas into a first portion of synthesis gas and a second portion of synthesis gas;
   a Fischer-Tropsch reactor, the Fischer-Tropsch reactor adapted to form primarily aliphatic hydrocarbons and carbon dioxide from the first portion of the synthesis gas, the Fischer-Tropsch reactor comprising an outlet for tail gases comprising unreacted carbon monoxide, carbon dioxide, and gaseous hydrocarbons and an outlet for Fischer-Tropsch liquid hydrocarbons;
   a compressor comprising an inlet for the Fischer-Tropsch tail gas and an outlet for a compressed tail gas;
   a steam methane reformer comprising inlets for the compressed gas and steam, and an outlet for a reformer effluent comprising hydrogen, carbon monoxide, and carbon dioxide, the steam methane reformer adapted to produce the reformer effluent from the inlet gases;

one or more shift reactors comprising an inlet for a gas mixture comprising the second portion of the synthesis gas and the reformer effluent and an outlet for shift reactor effluent comprising hydrogen and carbon dioxide, the one or more shift reactors adapted for converting a portion of the carbon monoxide and water in the inlet gas mixture to hydrogen and carbon dioxide;

an absorption system comprising an inlet for shift reactor effluent, an outlet for carbon dioxide, and an outlet for a concentrated hydrogen stream comprising trace amounts of CO and $CO_2$;

a methanator comprising an inlet for the concentrated hydrogen stream comprising trace amounts of CO and $CO_2$ and an outlet for methanator effluent; the methanator adapted for converting the CO and $CO_2$ to methane;

an ammonia synthesis reactor comprising an inlet for the methanator effluent, an inlet for a nitrogen stream comprising nitrogen from the air separation unit, an outlet for purge gases comprising hydrogen and an outlet for ammonia; the ammonia synthesis reactor adapted for producing ammonia;

a hydrogen membrane separator comprising an inlet for the purge gases comprising hydrogen, an outlet for a hydrogen rich gas stream, and an outlet for a hydrogen-lean gas stream;

a heat recovery steam generator comprising an inlet for at least a portion of the hydrogen-lean gases; the heat recovery steam generator mechanically coupled to a steam turbine adapted for the production of electricity;

a compressor comprising an inlet for the hydrogen-rich gases and an outlet for a compressed hydrogen-rich gas stream;

a pressure swing adsorption unit comprising an inlet for the compressed hydrogen-rich gas stream and an outlet for high purity hydrogen; and a reactor comprising an inlet for high-purity hydrogen, an inlet for the Fischer-Tropsch liquid hydrocarbons, and an outlet for upgraded liquid hydrocarbons, the reactor adapted for upgrading the Fischer-Tropsch liquid hydrocarbons by hydrotreating.

7. The integrated system of claim 6, further comprising an adiabatic pre-reformer upstream of the steam methane reformer and downstream of the compressor comprising an inlet for the second portion of the synthesis gas and the Fischer-Tropsch tail gas and an outlet for a compressed tail gas.

8. The integrated system of claim 6 further comprising at least one cleaning unit adapted to remove from the synthesis gas at least one selected from the group consisting of sulfur compounds, carbon dioxide, and char; the at least one cleaning unit comprising an inlet for synthesis gas and an outlet for cleaned synthesis gas, the at least one cleaning unit positioned upstream or downstream of the cooling unit for cooling the synthesis gas and upstream of the Fischer-Tropsch reactor.

9. The integrated system of claim 8 wherein the at least one cleaning unit comprises an acid gas removal unit, the acid gas removal unit further comprising an outlet for a stream comprising hydrogen sulfide.

10. The integrated system of claim 6, wherein the steam methane reformer, the one or more shift reactors, the absorption system, the methanator, and the ammonia synthesis reactor form an ammonia loop of an existing ammonia production plant.

\* \* \* \* \*